United States Patent Office 2,918,707
Patented Dec. 29, 1959

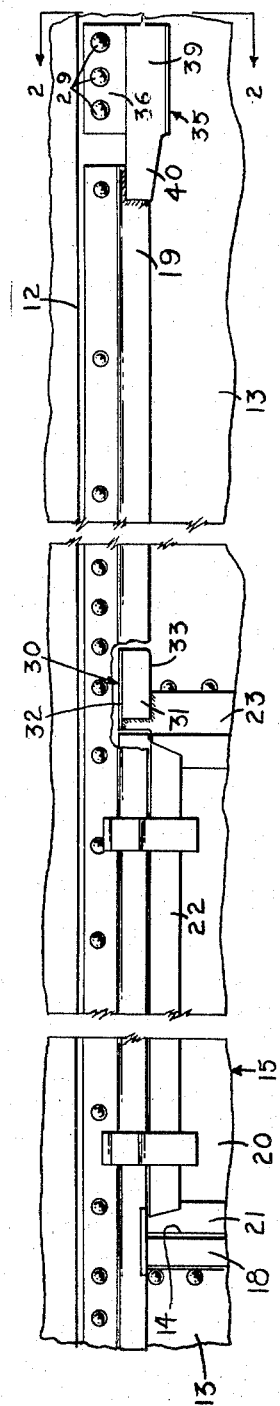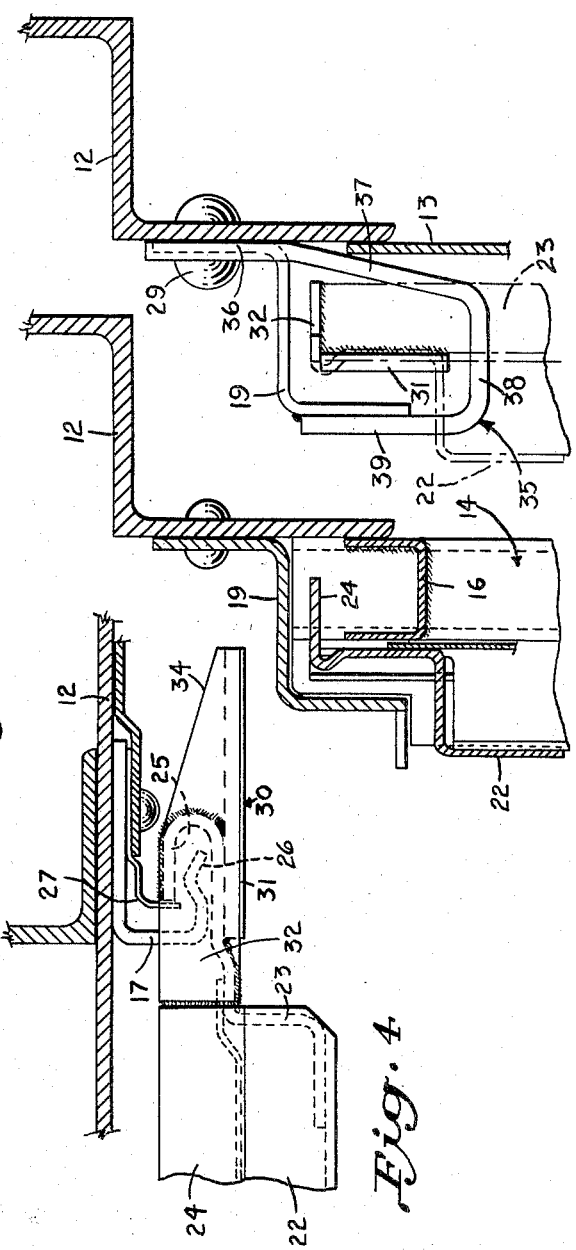

2,918,707

DOOR TOP CORNER CLOSURE AND SAFETY BRACKET

William Reid Shaver, Hammond, Ind., and Cornelius Arentze, Chicago, Ill., assignors to Pullman Incorporated, a corporation of Delaware Application November 21, 1957, Serial No. 697,891

7 Claims. (Cl. 20—26)

This invention relates to the side doors of railway box cars and has for its primary purpose the provision of an improved weather proofing and light excluding means at the door top corner combined with door safety hanger bracket means.

The principal object of the invention is the provision of improved weather proofing and light excluding means at the rear top corner of the door combined with door safety hanger bracket means in the open position of the door.

Another object of the invention is the provision of a safety hanger bracket for the rear top corner of the door in the open position incorporating guide means for lateral movements of the door relative to the car side.

A further object of the invention is to provide a door top rear safety hanger bracket combined with the rear top back stop for the door.

The foregoing and other objects of the invention are attained by the structure illustrated in the accompanying drawings wherein:

Figure 1 is a fragmentary side elevational view with parts broken away of a railway box car having a sliding side door and showing the application of the door safety hanger brackets of this invention.

Figure 2 is a cross-sectional view taken on the line 2—2 of Figure 1 showing a door safety hanger bracket in end elevation.

Figure 3 is a view similar to Figure 2 but with the section taken in the area of the door opening.

Figure 4 is a fragmentary top plan view of the top rear corner portion of the door showing the door brackets secured to the top and rear edge members of the door with part of the car structure shown in section.

Figure 5:
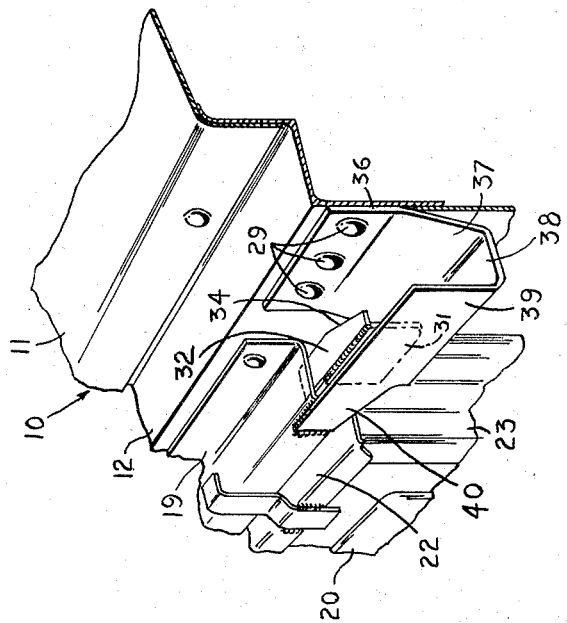
Figure 5 is a fragmentary perspective view of the door safety hanger bracket with the door in the open position.
Figure 6:
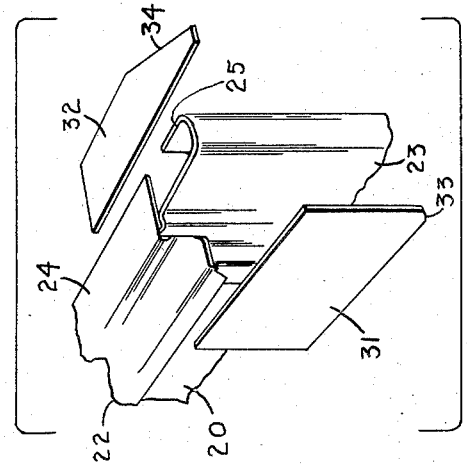
Figure 6 is an exploded perspective view of the door bracket showing the vertical and horizontal plates of which the angle-shaped bracket is comprised in disassembled relation to the top rear corner of the door.

This invention is applicable to the sliding side doors of railway box cars wherein the door due to the use of automatic latch means is disposed either in open position or closed position with no midway position of the door since the latch means automatically engage co-operating abutments in the open and closed positions of the door to maintain the door either fully closed or fully open. The invention utilizes a corner bracket on the door operating in conjunction with a hanger bracket on the car to provide a safety support for the door in its open position which eliminates any possibility of the door falling downwardly in the event of damage to the main supporting structure for the door.

In the drawings 10 represents a railway box car including a roof 11, a side plate 12 and a side wall 13 having a door opening 14 and a sliding door 15 adapted to cover and uncover the opening in its closed and open positions respectively. The door opening is provided with a trough-shaped door header 16 coextensive with the opening 14 and mounted on the car over the opening and extending adjacent to the inner surface of the door. A rear spark strip 17 is disposed at the vertical rear edge of the door opening and extends full height of the opening. A door front stop 18 is mounted on the car side at the front edge of the door opening and extends full height thereof. The door header member 16 extends continuously between the front stop and rear spark strip and is welded to both. A door top retainer 19 is mounted on the side plate 12 and extends continuously over the door opening and for the full opening movement of the door. The door front stop and rear spark strip are not only secured to the car side but are welded to the side plate and to the under side of this top retainer. The spark strip has a portion cut away at its top to permit passage of the door top edge as it is moved to the open position.

The door 15 is provided with a panel 20 and includes front, top and rear edge members 21, 22 and 23 respectively which cooperate with the door front stop 18, header 16 and rear spark strip 17 effectively to weatherproof the door and exclude light from around the edges. The top edge member 22 has a horizontal inwardly directed flange 24 overlying the trough-shaped header 16 and it is this flange that passes through the cutaway portion of the spark strip 17 adjacent its top. The door rear edge member 23 is provided with a return flange 25 which embraces a rearwardly extending flange 26 on the spark strip 17 and engages a flexible weather strip 27 disposed in the bight of the spark strip whereby to seal the rear edge of the door against the entrance of weather or light.

At the rear top corner of the door a bracket 30 is secured to the door top edge member and to the rear edge member in a position to project rearwardly of the door beyond the edge member 23. The bracket 30 is comprised of a plate 31 disposed vertically and a horizontal plate 32. The plate 31 is welded to the face of the door rear edge member 23 and projects a substantial distance beyond the rearmost portion of this member as at 33. The horizontal plate 32 is welded to the vertical plate 31 thereby providing an integrated angle-shaped bracket adapted to engage both over the top and the front face of the rear edge member. The plate 32 completely covers the open top end of the rear edge member and the adjoining end of the plate is welded to the end of the horizontal flange 24 on the top edge member 22 thus effectively to close the top end of the member 23 not only against the entrance of weather but completely to exclude the entrance of light at this top rear corner of the door. The plates 31 and 32 reinforce each other through their welded connection to provide a strong rigid bracket adapted to withstand the vertical and horizontal forces imposed in service. The plate 32 on its edge facing the car side is tapered adjacent the rear of the bracket to provide a guiding surface 34 to guide and center the door as it moves to open position as more fully hereinafter set forth.

A support bracket 35 which also functions as a rear stop for the door in its open position is provided on the car for cooperation with the bracket 30 on the door. The bracket 35 is generally U-shaped and is mounted on the car side at a position beyond the rear end of the door top retainer 19. The bracket includes an inner vertical attaching flange 36 which abuts flatwise against the side plate 12 and is secured thereto by rivets 29 which provide for ready removal and replacement. A sloping inner side wall 37 extends downwardly from the flange 36 and the horizontal bottom web 38 extends outwardly from the inside wall 37. An upstanding side wall 39 spaced outwardly from the inner wall 37 completes the U-section and it will be seen that the bracket 35 thus formed provides an upwardly open safety support for the side door when the bracket 30 enters the U-section in the open position of the door. A forwardly directed extension 40 of the outer side wall 39 overlaps the outermost face of the door top retainer 19 and is welded thereto whereby to afford a reinforcing and further supporting connection for the bracket 35 to the car structure.

The bracket 35 is located on the car side substantially at the open position of the door and is disposed so that the projecting portion 33 of the bracket 30 on the door extends into the U-section of the supporting bracket when the door is moved to its open position whereby the rear end of the door is fully protected against any possibility of its falling downwardly or being displaced laterally beyond the confines of the bracket. The projection 33 overlies the horizontal bottom web 38 of the supporting bracket to safeguard against the door dropping and the upstanding outer wall 39 prevents escape outwardly. As the bracket 30 enters the supporting bracket 35 the door is guided laterally by means of the engagement of the tapered surface 34 on the plate 32 with the inner wall 37 of the support bracket whereby the door is maintained in properly spaced relation to the car side and is prevented from engaging against the side wall as well as to keep the door in alignment with the supporting track and bottom rear stop (not shown). The front end of the door is supported against falling in the open position thereof by means of the overlying relationship of the horizontal flange 24 on the door top edge member 22 with respect to the rear spark strip 17 and this relationship is maintained by the overhanging disposition of the door top retainer 19 with respect to the door which prevents the door from being displaced outwardly and thus maintained the door cannot drop since the flange 24 when the door is fully opened extends over the spark strip 17. The door therefore is positively supported against any possibility of its dropping both at the top rear corner thereof and at the top front corner of the door.

Thus it will be seen that there has been provided a door safety hanger for a railway box car side door which functions in the open position of the door and comprises an angle-shaped bracket projecting rearwardly of the door rear edge mounted on the top rear corner of the door adapted to enter and cooperate with a U-section bracket mounted on the car side whereby to safeguard the door against accidental falling in the event of damage or displacement of the main support for the door and which guides and aligns the door as it moves to the open position through a sliding engagement of the door bracket with the bracket on the car side.

What is claimed is:

1. In a railway box car having a side wall and a sliding door mounted on the wall and movable from a closed position to an open position, the combination comprising a bracket secured at the top of said door projecting rearwardly beyond the rear edge of the door, and a supporting bracket secured on said side wall in spaced relation to said rear edge of the door in said closed position thereof and adapted to be overlapped by the first named bracket only in said open position of said door.

2. In a railway box car having a side wall and a sliding door mounted on the wall and movable from a closed position to an open position, the combination comprising an angle shaped bracket secured to the door and projecting rearwardly beyond the top rear corner of the door, and a U-shaped safety support bracket secured on said side wall in spaced relation to the rear edge of the door in said closed position thereof, said angle shaped bracket entering said U-shaped bracket only in said open position of the door to provide a safety support at the full open position of the door.

3. In a railway box car having a side wall and a sliding door mounted on the wall and movable from a closed position to an open position, the combination comprising a bracket secured to the door having an angle shaped portion projecting beyond the rear edge of said door adjacent to the top rear corner of the door, said angle shaped portion including a horizontal flange having a tapered edge providing a tapering guide surface on said bracket, and a safety support secured on said side wall in spaced relation to the rear edge of the door in said closed position thereof, said angle shaped portion of said bracket overlying a horizontal portion of said safety support only in said open position of the door and said guide surface engaging a generally vertical portion of the support to guide said door laterally with respect to said side wall in the full open position of the door.

4. In a railway box car having a side wall and a sliding door mounted on the wall and movable from a closed position to an open position, said door having a vertical rear edge member including a return flange spaced from the member and extending full height thereof and leaving an upwardly directed opening at the top between said member and the flange, a door top edge member having a horizontal flange partially overlying said rear edge member, a bracket secured to said rear edge member having a horizontal portion overlying said opening and secured to said horizontal flange of the top edge member, said bracket having a portion projecting rearwardly of the door beyond said rear edge member, and a safety support on said side wall spaced rearwardly from the door in said closed position thereof adapted to be overlapped by said last named portion of said bracket only in sa'd open position of the door.

5. In a railway box car having a side wall and a sliding door mounted on the wall and movable from a closed position to an open position, a door top retainer on said side wall overlying said door, an angle shaped bracket secured to the door and projecting rearwardly from the top rear corner of the door, a U-shaped bracket on the side wall spaced rearwardly from said door in the closed position of the door, said angle shaped bracket entering said U-shaped bracket in said open position of the door and overlying a portion of the U-shaped bracket to provide a safety support for the door in said open position, and an extension on the U-shaped bracket secured to said top retainer.

6. In a railway box car having a side wall and a sliding door mounted on the wall and movable to an open position, a vertical rear spark strip on said wall, a door top edge member having a horizontal flange overlying said spark strip in said open position of the door, a horizontal top retainer on the wall overlying said door and the spark strip, a bracket secured to the top rear corner of the door and extending rearwardly of the door, and a safety support bracket on the side wall, said first named bracket overlying a portion of the safety support bracket in said open position of the door.

7. In a railway box car having a side wall and a sliding door mounted on the wall and movable to an open position, a vertical rear spark strip on said wall, a door top edge member having a horizontal flange overlying said spark strip in said open position of the door, a door rear edge member having a return flange spaced from the member and extending the full height thereof for cooperation with said spark strip and leaving an opening at the top between said member and the flange, a horizontal top retainer on said wall overlying the door, an angle shaped bracket including a horizontal flange overlying said opening and having a tapering guide surface, said bracket extending rearwardly of said rear edge member and said horizontal flange on the bracket being secured to said horizontal flange on the top edge member, a U-shaped safety support bracket on said side wall, said angle shaped bracket overlying a portion of said safety support bracket in said open position of the door and said guide surface engaging another portion of the support bracket to guide the door laterally with respect to the side wall, and an extension on a third portion of the U-shaped bracket secured to said top retainer.

References Cited in the file of this patent

UNITED STATES PATENTS

| | | |
|---|---|---|
| 907,833 | Mallory | Dec. 29, 1908 |
| 1,045,327 | Rupp | Nov. 26, 1912 |